(12) United States Patent
Prescott et al.

(10) Patent No.: US 6,926,040 B1
(45) Date of Patent: Aug. 9, 2005

(54) THERMALLY INSULATED PIPELINES

(75) Inventors: Neal Prescott, Houston, TX (US); Ravil Perera, Houston, TX (US)

(73) Assignee: Coflexip SA, (FR)

( * ) Notice: Subject to any disclaimer, the term of this patent is extended or adjusted under 35 U.S.C. 154(b) by 427 days.

(21) Appl. No.: 10/048,379

(22) PCT Filed: Jul. 28, 2000

(86) PCT No.: PCT/GB00/02872

§ 371 (c)(1),
(2), (4) Date: Apr. 29, 2002

(87) PCT Pub. No.: WO01/07824

PCT Pub. Date: Feb. 1, 2001

(30) Foreign Application Priority Data

Jul. 28, 1999 (GB) .................................... 9917733

(51) Int. Cl.[7] .................................................. F16L 9/14
(52) U.S. Cl. ..................... 138/148; 138/113; 138/114; 138/149
(58) Field of Search ..................... 138/148, 113, 149, 138/114, 112, 108

(56) References Cited

U.S. PATENT DOCUMENTS

| | | | | | |
|---|---|---|---|---|---|
| 229,620 | A | * | 7/1880 | Lynch | 138/148 |
| 340,691 | A | * | 4/1886 | Aldrich | 138/113 |
| 2,531,658 | A | * | 11/1950 | Walsh | 138/101 |
| 2,664,112 | A | * | 12/1953 | Isenberg | 138/113 |
| 2,761,525 | A | * | 9/1956 | Moss | 181/282 |
| 3,410,313 | A | | 11/1968 | Martin | 138/103 |
| 3,595,275 | A | * | 7/1971 | Steans et al. | 138/114 |
| 4,014,369 | A | * | 3/1977 | Kobres, Jr. | 138/112 |
| 4,124,040 | A | * | 11/1978 | Miller | 138/148 |
| 4,233,816 | A | * | 11/1980 | Hensley | 62/50.7 |
| H594 | H | * | 3/1989 | Adorjan | 138/148 |
| 5,996,643 | A | * | 12/1999 | Stonitsch | 138/143 |

FOREIGN PATENT DOCUMENTS

| | | |
|---|---|---|
| EP | 0177475 | 4/1986 |
| FR | 1423113 | 3/1966 |
| GB | 652331 A | 4/1951 |

* cited by examiner

*Primary Examiner*—Patrick Brinson
(74) *Attorney, Agent, or Firm*—Ostrolenk, Faber, Gerb & Soffen, LLP

(57) ABSTRACT

A thermally insulated pipeline assembly comprises an inner pipe surrounded by and spaced from a jacket, which is in turn surrounded by and spaced from an outer casing. The annular space between the inner pipe and the jacket is substantially filled with thermal insulating material such as open cell polyurethane foam, which is preferably injected into the jacket and cured in situ. The space between the jacket and the outer casing may be filled with pressurized gas. The jacket may have apertures to allow the gas access to the annular insulated space. The arrangement provides improved thermal insulation, particularly when the casing is pressurized, by reducing thermal transfer by convection between the inner pipe and the outer casing. The arrangement is also applicable to pipeline bundles, with a plurality of inner pipes each having an associated jacket and insulation, all surrounded by a common casing.

14 Claims, 3 Drawing Sheets

THERMALLY INSULATED PIPELINES

TECHNICAL FIELD OF THE INVENTION

The invention relates to thermally insulated pipelines, particularly but not exclusively subsea oil and/or gas pipelines, and to methods of forming such pipelines.

BACKGROUND OF THE INVENTION

In deep water offshore oil field developments, pipelines are installed to transport crude oil and gas from subsea well-heads to fixed platforms or floating storage facilities.

Crude oil contains many different chemical components and substances, from gases to semi-solid hydrocarbons, such as asphalt and paraffin wax, and frequently also water. Under the high underground pressures and temperatures, the crude oil flows easily in a liquid or gaseous state. When the hot crude oil comes from the reservoir to the ocean floor and enters the pipeline for transportation to the platform, it gets into contact with a cold sea water environment, which at larger depths (1000 ft+305 m) has temperatures of about 40 degrees F. (4–5° C.). Under these conditions the crude oil will cool down rapidly. When cooled down, water and the semi-solid components and/or gases in the crude oil tend to solidify forming hydrate and paraffin deposits on the pipeline wall. Consequently the pipeline cross-section is reduced and the flow capacity is diminished, adversely affecting the oil production. In extreme cases complete stoppage of the pipeline may occur.

To prevent the build-up of paraffin and hydrates, pipeline and flowlines can be insulated on the outside with thermal insulating materials, to reduce heat loss of the flowing crude oil, and to guarantee a required arrival temperature at the separating facility. Successful thermal insulating materials used in offshore pipeline applications include polyurethane foams, and epoxy and urethane based syntactic foams with glass microspheres.

One commonly used form of pipeline insulation consists of a "pipe-in-pipe" (PIP) structure, in which thermal insulation is applied to the surface of a pipeline and the insulation is surrounded by an outer pipe or "casing pipe". Generally, there is an annulus between the interior surface of the casing pipe and the outer surface of the thermal insulation. A number of insulated pipes (a "pipeline bundle") may be enclosed in the same casing pipe. Commonly, the thermal insulation comprises a plurality of C-section panels of insulating material secured to the outer surface of the pipeline. Flexible panels are also used, which can be deformed to wrap around the pipeline. It is also common to pressurise the interior of the casing pipe using, for example, nitrogen. This improves the resistance of the casing pipe to collapse under hydrostatic pressure and thus allows the wall thickness of the casing pipe to be reduced. Where the thermal insulation comprises an open-celled foam, the pressurising gas will also penetrate the foam.

In an insulated PIP assembly of this general type, one mechanism for heat transfer between the pipeline and the casing pipe is by convection. This is particularly so in the case of open-cell foam insulating materials. The use of pressurised gas in a PIP system increases convection and hence increases heat transfer between the insulated pipeline and the casing pipe. Where the thermal insulation comprises C-section panels or other discrete panels or the like, gaps usually exist between adjacent panels, typically of the order of ⅛th inch (0.3175 cm). The present inventors have found that the presence of such gaps seriously reduces the effectiveness of the thermal insulation, as a result of convection when the casing pipe is pressurised. This convective heat loss effect is negligible when the gas in the casing is at atmospheric pressure, but becomes increasingly significant with increasing casing pressure. WO99/05447 discloses a deep sea insulated pipe encased by an insulating core, the pipe having a protective outer casing. The insulation being made from microspheres contained in a resin bearing foam.

DISCLOSURE OF THE INVENTION

The invention is concerned generally with the insulation of subsea pipelines.

The invention provides a pipeline assembly (particularly for carrying oil and/or gas from subsea accumulations of hydrocarbons long the seabed or from the seabed to the sea surface), comprising an inner pipe, a jacket surrounding and spaced from the inner pipe so as to define a generally annular space between the inner pipe and the jacket, and an outer casing surrounding and spaced from the jacket, the space between the jacket and the casing being capable of containing gas under pressure and in which the jacket includes apertures to allow the gas under pressure access to the generally annular insulated space between the pipe and the jacket said space being substantially filled with insulating material.

In preferred embodiments, in which the space between the jacket(s) and the casing is capable of containing gas under pressure.

In these embodiments, it is preferred that the jacket includes apertures to allow the gas under pressure access to the generally annular insulated space between the pipeline and the jacket.

It is preferred that the jacket is of high density polyethylene or of other thermoplastic or metal.

It is also preferred that the inner pipe is supported within said jacket by first spacer elements disposed along the length of the inner pipe, and that the jacket is supported within said casing by further spacer elements disposed along the length of the jacket.

There may be at least two inner pipes surrounded by and spaced from individual jackets, the jackets being surrounded by and spaced from the casing.

Preferably, the insulating material is open cell foam, such as polyurethane foam, and suitably having a density in the range 1 to 15 lb/cu ft, (16–240 kg/m$^3$).

In accordance with another aspect of the invention, there is provided a method for the production of a pipeline assembly in accordance with the first aspect, comprising the steps of arranging at least one inner pipe within at least one jacket with a generally annular space therebetween, introducing insulating material into the annual space between the at least one inner pipe and the at least one jacket, and arranging a casing to surround the at least one jacket with a space therebetween and pressurising the interior of the casing.

It is preferred that the thermally insulating material is introduced in a liquid state, and is allowed to solidify into an open cell foam within the annular space.

It is further preferred that the jacket is arranged to lie generally horizontally during introduction of the insulating material.

It is still further preferred that the jacket is arranged to lie at a slight slope during introduction of the insulating material, and then arranged to lie horizontally during curing of that material.

The method preferably includes disposing first spacers along the length of the inner pipe whereby said inner pipe is supported within said jacket.

The method preferably further includes disposing further spacer elements along the length of the jacket whereby said jacket is supported within said casing.

The method preferably further includes the step of providing the at least one jacket with small apertures to allow pressurised gas to penetrate the insulating material.

BRIEF DESCRIPTION OF THE DRAWINGS

Embodiments of the invention will now be described, by way of example only, with reference to the accompanying drawings, in which:—

DESCRIPTION OF THE SPECIFIC EMBODIMENT

This description includes schemes for the manufacture of thermal insulated single pipe lengths, typically of steel, and for the manufacture of thermal insulated multiple pipe lengths (bundles). The steel pipe is enclosed in a jacket using state of the art materials for the jacket, such as steel, aluminum, high density polyethylene, or other thermoplastic material. The jacket is enclosed in a casing. The insulation is suitably an open cell polyurethane foam and allows the annulus between jacket and casing to be pressurised with nitrogen, air or other gas to enhance the collapse resistance of the casing from external pressure in deep water. The combination of pipe, insulation, jacket, pressurised gas and casing will be described as a pipeline assembly. This description also includes options for the commercial fabrication and installation of pipeline lengths.

Description of the Manufacture

Figure 1:
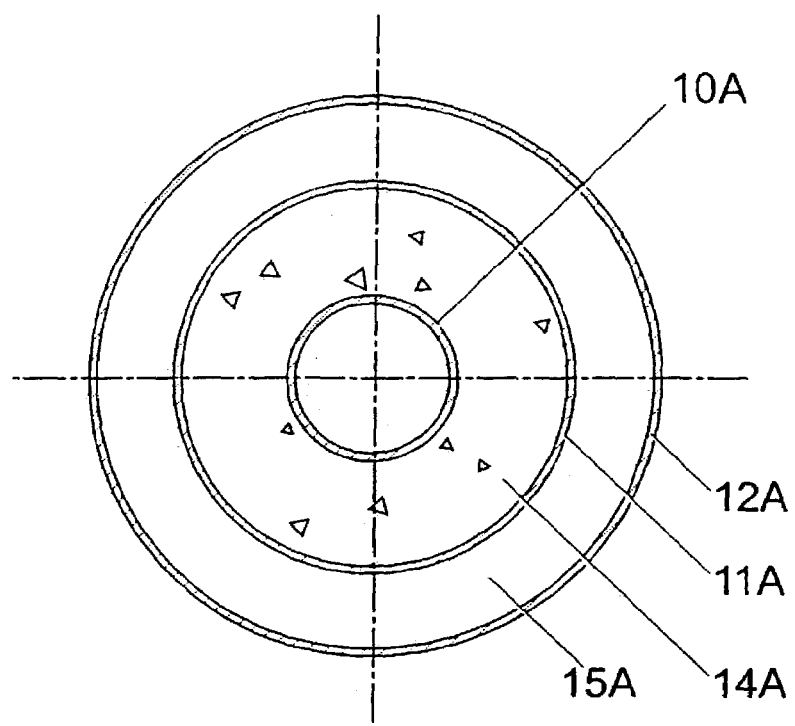
FIG. 1 is a cross section of a first embodiment of a pipeline assembly in accordance with the present invention.
Figure 2:
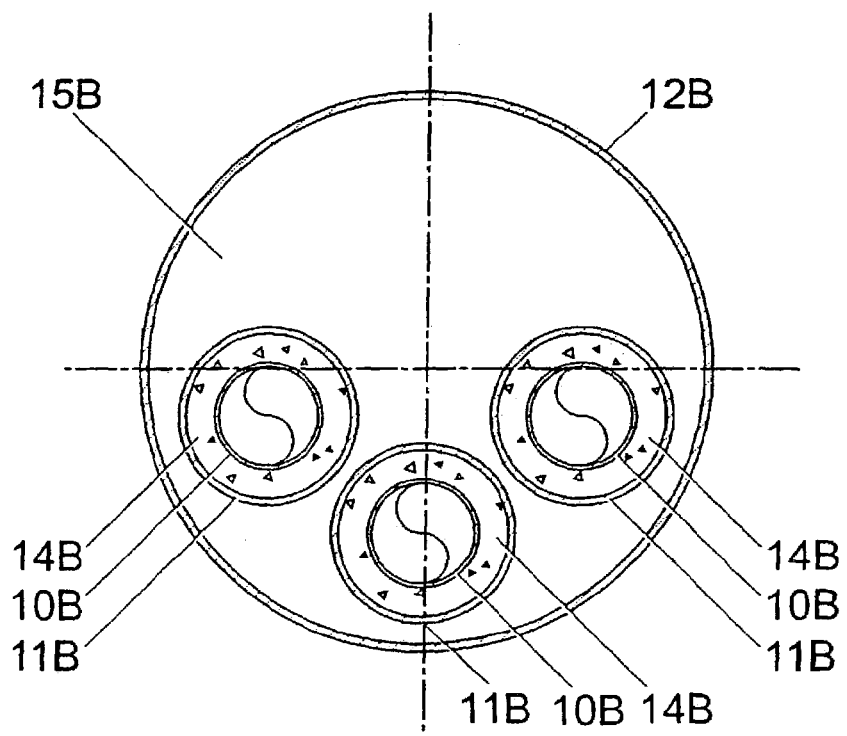
FIG. 2 is a cross section of a second embodiment of a pipeline assembly in accordance with the present invention.

As shown in FIGS. 1 and 2, the manufacture consists of one continuous single thermal insulated steel pipe 10A, or, multiple continuous single thermal insulated steel pipe 10B bundled together. The single or multiple pipes are encased in an outer steel pipe 12A/12B, hereafter referred to as a casing. Each of the pipes 10A/10B is separately contained in a pipe jacket 11A/11B hereafter referred to as a jacket, which can for instance be manufactured of a high density polyethylene. The annulus 14A/14B formed by the pipe and the jacket is filled with an open cell thermal insulation. The space 15A/15B inside the casing 12A/12B which surrounds the pipe/jacket assembly(s) is filled with high pressure gas.

As an alternative to high density polyethelene, the jacket 11A/11B can be manufactured of steel, aluminum, urethane or other suitable material.

Provision of a jacket to contain the thermal insulation around the pipe enables the thermal insulation to be formed without significant voids, by using the jacket(s) 11A/11B as a mould to form a continuous layer of thermal insulation in situ on the pipe(s) 10A/10B. Injection of the thermal insulation as a liquid allows the thermal insulation to set within the jacket 12A/12B. This is particularly important when the casing is pressurised. In these circumstances, the impact of pressurisation on the overall heat transfer coefficient is significantly reduced as there are no gaps in the insulation. The jacket may be provided with small apertures 18 (FIG. 4) to allow the pressurised gas to penetrate the thermal insulation material so as to avoid any risk of the thermal insulation layer collapsing under pressure.

Fabrication of Thermal Insulated Pipe Lengths

Figure 3:
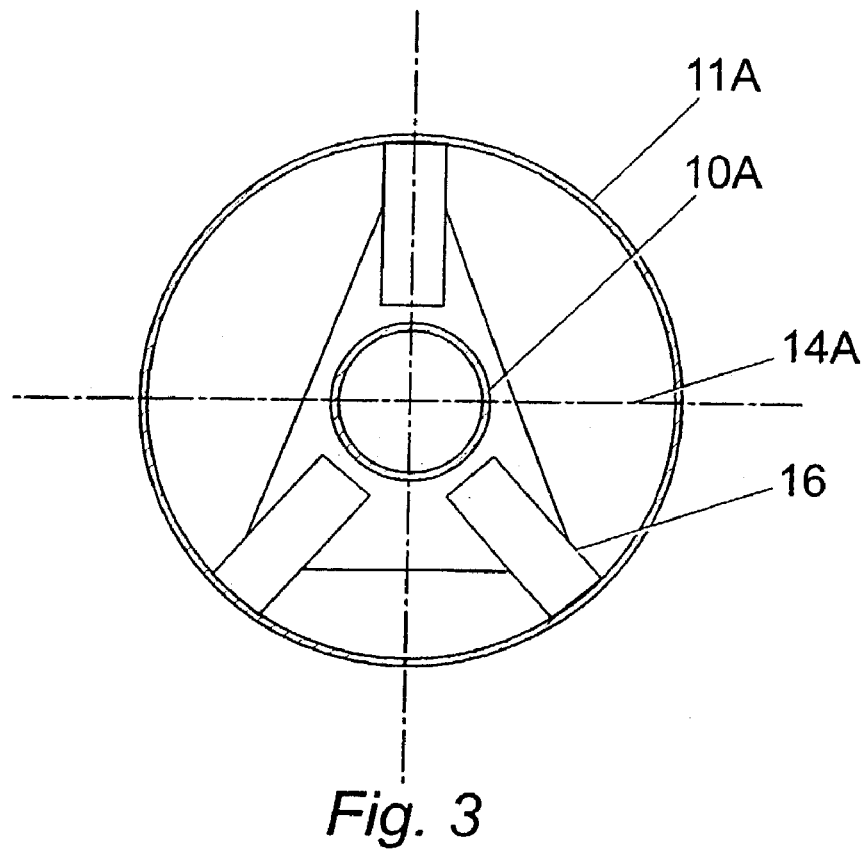
FIG. 3 is a cross section of a detail of part of the pipeline assembly of FIG. 1.
Figure 4:
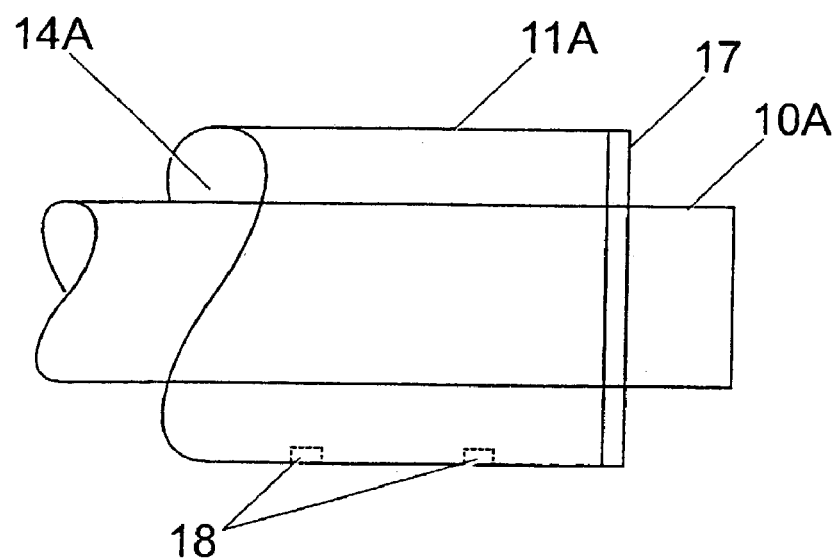
FIG. 4 is a longitudinal section of one end of a length of the pipeline assembly of FIG. 1.

As shown in FIGS. 3 and 4, one single steel pipe length 10A, typically 40 to 80 ft (12 to 24 m) long, is inserted into a jacket length 11A, slightly shorter than the pipe length, to allow for a field weld during the assembly of the pipeline(s). Spacers 16 are attached to the pipe 10A to maintain a constant position of the pipe relative to the jacket 11A. These spacers 16 can be fabricated of high density polyethylene, urethane or polypropylene material and can be mounted on sliding runners, to minimise frictional loads during the insertion.

The pipe and jacket lengths are closed off at both ends with concentric shaped end closures 17. The end closures may also be manufactured of high density polyethylene, urethane or polypropylene material.

An open cell polyurethane thermal insulation material of light unit weight (2 to 5 lb/cu ft 32 to 80 kg/m$^3$) is injected into the annular space between the steel pipe 10A and the jacket 11A. Optionally, the jacket has holes 18 to allow nitrogen into the jacket. This may be undesirable with certain insulation materials such as C-panels, as described above, where it is desirable to isolate the thermal insulation from the pressurised gas inside the jacket. In addition to polyurethane other types of insulation such as syntactic foam may be used.

When injecting the thermal insulation, the jacket is preferably set at a slope to allow for a better flow of the material. The thermal insulation will develop heat during the chemical reaction of its components, therefore partial pours may be required. After the thermal insulation has been poured and the length is completely filled, then the jacket is set back in a horizontal position for cure of the thermal insulation. As a rule 90% of cure should be attained in 24 hours.

The required thickness of thermal insulation is governed by the OD of the pipe 10A and the selected ID of the jacket 11A.

The steel pipe may be coated with an anti-corrosion coating, for example fusion bonded epoxy.

The pre-fabricated lengths of thermal insulated pipe can then be transported to the pipeline fabrication site.

Assembly of Pipeline(s) and Casing Lengths

The pre-fabricated thermal insulated pipe lengths are assembled into continuous pipeline(s) length(s). The pipeline fabrication site is typically on the shore, suitably a beach, with access to the ocean.

At the field joints between pipe lengths, half shells of jacket will be secured to the existing jacket, for example, forming an annular space around the pipe. Thermal insulation material, such as polyethylene open cell foam (5 to 20 lb/cu ft 80 to 320 kg/m$^3$) or a syntactic foam (epoxy or urethane base with glass spheres), is inserted into this space. The purpose of the foam is to act as a thermal insulator, and to provide sufficient strength at the field joint, for the transfer of the pipe weight through spacers to the casing. Field joints of this general type are well known in the art.

The pipe/jacket lengths are then typically placed on rollers.

The casing size (OD and wall thickness) is selected to keep the submerged weight of the completed bundle within a given tolerance that will allow for the tow of the assembled pipeline system to the installation site.

Figure 5:
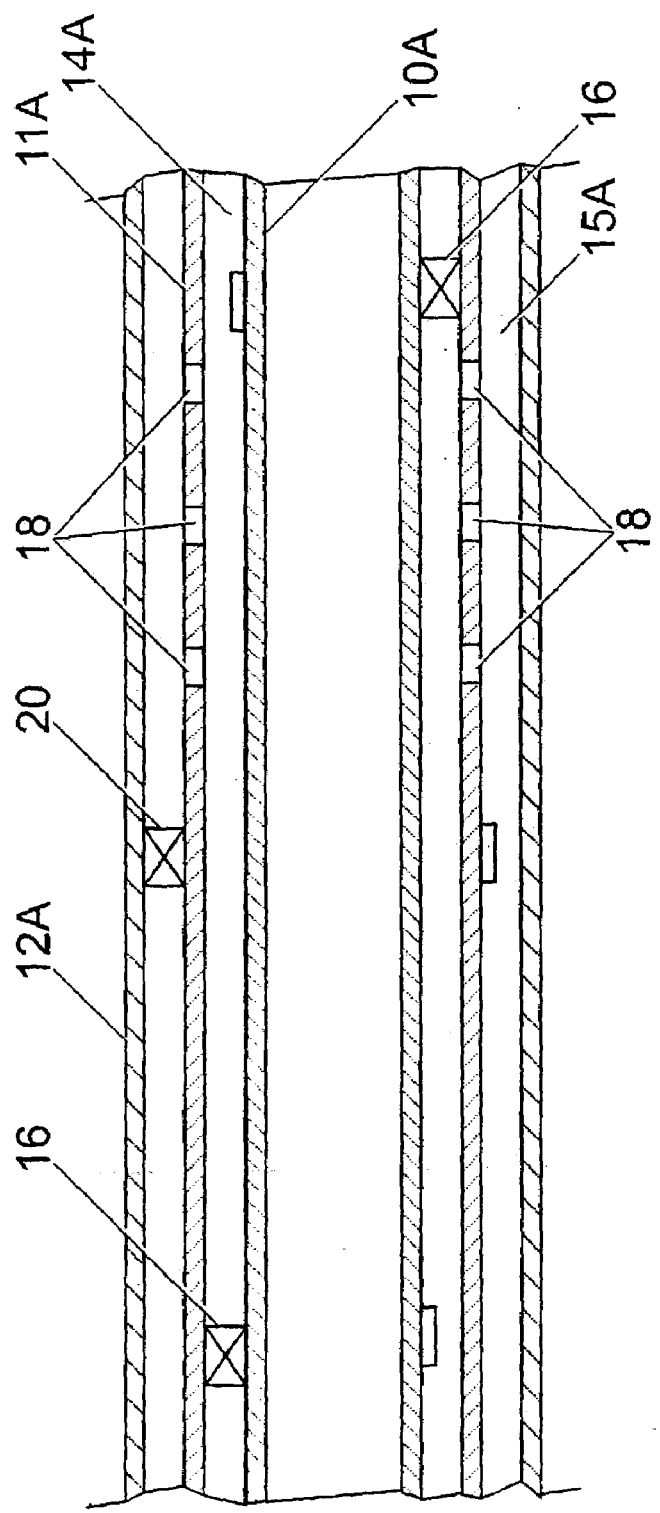
FIG. 5 is a longitudinal section of part of a length of the pipeline assembly of FIG. 1.

FIG. 5 illustrates the assembly with the pipe 10A/jacket 11A located inside the casing 12A.

A casing length is fabricated, of the same length as the assembled pipe. The ID of the casing 12A is such as to allow insertion of the thermal insulated pipe and jacket with spacers 20. The casing is placed in sequence with the pipe and jacket.

The casing may be coated with a corrosion coating (such as fusion bonded epoxy), and an abrasion coat may be applied, suitably to the bottom half of the casing only.

A cable from a winch is inserted into the full length of the casing, and attached to the pipe and jacket.

Bundling Operation

The pipe or pipes with their jacket or jackets are assembled in a cluster and pulled into the casing. This operation is called the bundling operation.

As the pipe(s) are pulled into the casing line, spacers 20 are clamped around the pipe(s) at the field joints, to position the pipe(s) relative to the casing. The spacers 20 may be provided with wheels or runners to reduce the pulling loads induced by friction, and to prevent damage to the HDPE jacket at the mid span sag between spacer supports.

It will be understood that the thermal insulation material could be injected into the jackets after the jackets/pipes have been located inside the casing.

Typically, air tight bulkheads are welded to the beginning and end of the bundle after the pipe(s) have been inserted into the casing. End structures housing valves and connections are typically also attached to both ends of the bundle.

Whilst FIGS. 3 to 5 illustrate an assembly with a single inner pipe and jacket, as in FIG. 1, it will be understood that similar techniques would be employed for pipe bundles such as that shown in FIG. 2. This would require a different type of spacer between the jackets and the casing, as is well known in the art. In all cases, the spacers between the inner pipe and the jacket and between the jacket and the casing are preferably of a type which allow gases and liquids to pass therethrough.

Bundle Move-Over, Launch and Tow to Site

The completed bundle (or pipeline assembly) is moved over into the surf with shore equipment.

Nitrogen under pressure is injected into the casing. The nitrogen pressure is such as to offset the hydrostatic pressure at the installation site of the bundle and prevent buckling.

The casing size (OD and wall thickness) is selected to keep the submerged weight of the completed bundle within a given tolerance, which will allow for the tow of the bundle system to the installation site, with the available towing vessel(s).

A towing line from the towing vessel is transferred to shore and attached to the front end of the bundle. The bundle (or pipeline assembly) is launched and bottom towed to the final installation site.

Specific features and advantages of the invention are set out below:

1. A pipeline system as described, consisting of a steel pipeline(s) surrounded with thermal insulation enclosed in a pipe jacket for application in a pressurised fluid environment. The steel pipe, thermal insulation and jacket are inserted in a steel casing pipe, where the casing annulus is pressurised to enhance collapse resistance from external pressure in deep water.

2. The use of HDPE jackets or similar thermoplastic or metal jacket in the fabrication of thermal insulated steel pipelines.

3. The use of HDPE jackets as thermal insulation.

4. The use of a HDPE jacket to serve as a mould for the injection of thermal insulation material such as open cell polyurethane thermal insulation.

5. The selection of the thermal insulation material and the thickness of the insulation to control the heat transfer coefficient of the system.

6. The fabrication and installation of continuous thermal insulated pipeline(s).

7. The fabrication of thermal insulated short pipe joints.

Improvements and modifications may be incorporated without departing from the scope of the invention.

What is claimed is:

1. A thermally insulated pipeline assembly comprising an inner pipe, a jacket surrounding and spaced from the inner pipe so as to define a generally annular space between the inner pipe and the jacket, and an outer casing surrounding and spaced from the jacket, the space between the jacket and the casing being capable of containing gas under pressure and in which the jacket includes apertures to allow the gas under pressure access to the generally annular insulated space between the pipe and the jacket said space being substantially filled with insulating material.

2. An assembly as claimed in claim 1, in which the jacket is of high density polyethylene or of other thermoplastic or metal.

3. An assembly as claimed in claim 1, wherein the inner pipe is supported within said jacket by first spacer elements disposed along the length of the inner pipe.

4. An assembly as claimed in claim 1, wherein said jacket is supported within said casing by further spacer elements disposed along the length of the jacket).

5. An assembly as claimed in claim 1, in which there are at least two inner pipes surrounded by and spaced from individual jackets, the jackets being surrounded by and spaced from the casing.

6. An assembly as claimed in claim 1, in which the insulating material is open cell foam.

7. An assembly as claimed in claim 6, wherein said foam comprises polyurethane foam.

8. An assembly as claimed in claim 6, wherein said foam has a density in the range 1 to 15 lb/cu ft (16 to 230 Kg/m$^3$).

9. A method for the production of a pipeline assembly, comprising the steps of arranging at least one inner pipe within at least one jacket with a generally annular space therebetween, introducing insulating material into the annular space between the at least one inner pipe and the at least one jacket, arranging a casing to surround the at least one jacket with a space therebetween and pressurising the interior of the casing, and providing the at least one jacket with apertures to allow pressurized gas to penetrate the thermally insulating material.

10. A method as claimed in claim 9, in which the thermally insulating material is introduced in a liquid state, and is allowed to solidify into an open cell foam within the annular space.

11. A method as claimed in claim 10, in which the jacket is arranged to lie generally horizontally during introduction of the insulating material.

12. A method as claimed in claim 9, in which the jacket is arranged to lie at a slight slope during introduction of the insulating material, and then arranged to lie horizontally during curing of that material.

13. A method as claimed in claim 9, including disposing first spacers along the length of the inner pipe whereby said inner pipe is supported within said jacket.

14. A method as claimed in claim 9, including disposing further spacer (16) elements along the length of the jacket whereby said jacket is supported within said casing.

* * * * *